Dec. 19, 1967  J. POYSER ET AL  3,358,522

CAM CHAIN TENSIONER

Filed Aug. 16, 1965

Inventors:
Edward C. Turner
and John Poyser
By: Evan D. Roberts, Atty.

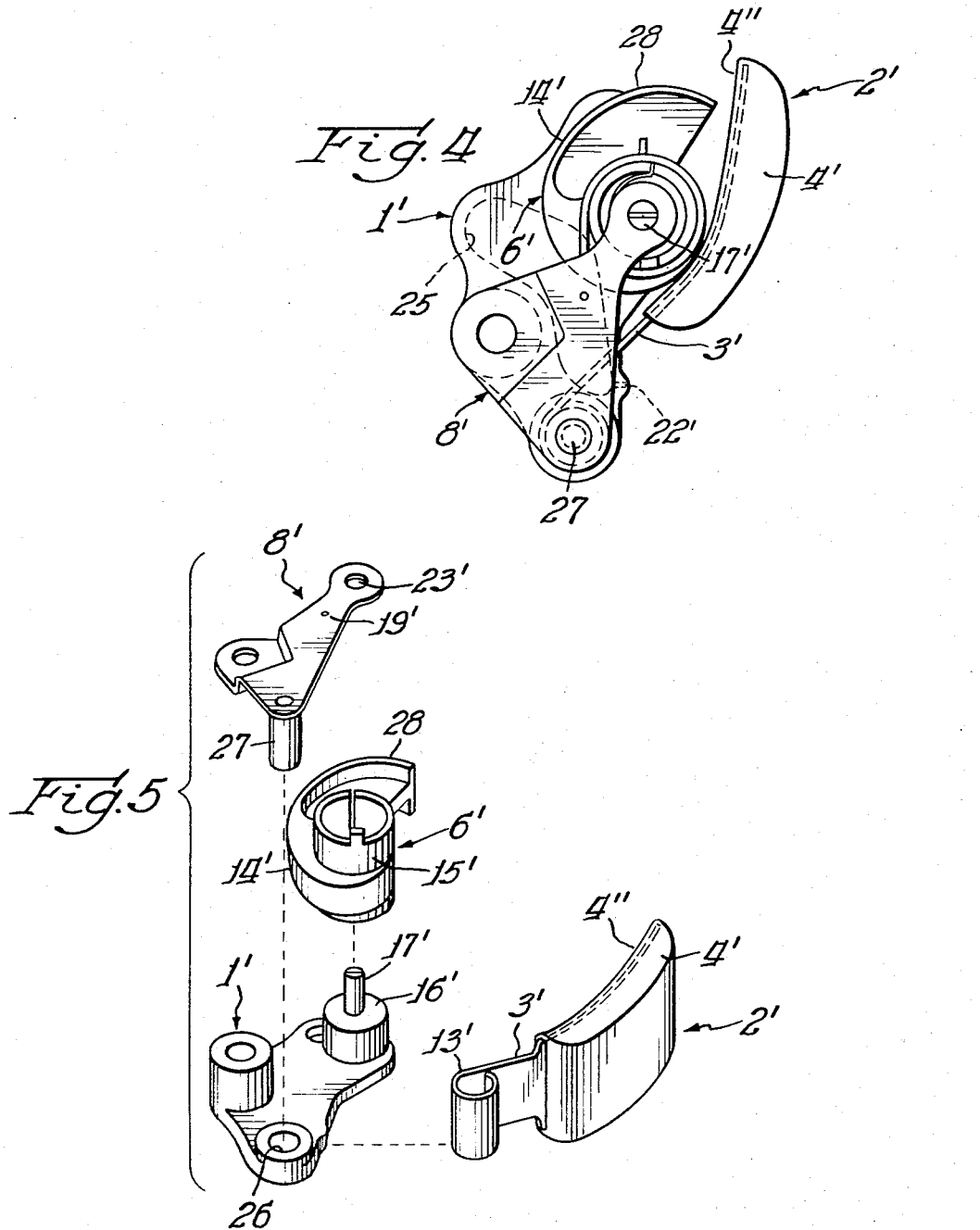

United States Patent Office 3,358,522
Patented Dec. 19, 1967

3,358,522
CAM CHAIN TENSIONER
John Poyser, Letchworth, and Edward C. Turner, Hitchin, England, assignors to Morse Chain Company, a corporation of New York
Filed Aug. 16, 1965, Ser. No. 480,023
4 Claims. (Cl. 74—242.11)

ABSTRACT OF THE DISCLOSURE

A chain tensioner as disclosed herein which illustrates a chain contacting member adjustably urged into contact with the chain by a spiral cam. The cam is adjustably and resiliently urged against a shoe and spring means is provided to restrict contra-rotation of the cam to maintain the shoe in adjusted contact with the chain.

---

This invenion relates to tensioning devices for belts or chains and in its preferred form relates to a tensioning device for maintaining the tension of a timing chain of an internal combustion engine, particularly where such engines are used in cars and other road vehicles.

Such chain tensioning devices often comprise a shoe which is urged against the run of a chain to be tensioned between two sprockets so as to take up slack in the chain and prevent any undue vibration or the like in the chain. An object of the present invention is to provide such a tensioning device having improved means for maintaining the shoe in the position to take up slack in a chain to be tensioned.

According to the invention there is provided a chain tensioning device comprising a mounting plate, a snail cam having an increasing radius rotatably mounted on the mounting plate, a shoe carrying a chain contacting member adapted to be held by the snail cam against a chain to be tensioned, means torsionally urging the cam in the direction of increasing radius, and resilient means for restricting contra-rotation of the cam and thus maintaining the shoe in its position held against the chain to be tensioned.

Preferably the resilient means comprises a one way friction clutch which conveniently may comprise a helical spring secured at one end to the mounting plate and surrounding an extension portion of the snail cam whereby rotation of the snail cam in its direction of increasing radius tends to unwind the helical spring while contra-rotation of the snail cam tends to tighten the helical spring about the extension portion whereby it grips the extension portion frictionally to prevent such contra-rotation of the snail cam. This construction is particularly useful in that the small amount of resilient retraction permitted by the helical spring before it positively prevents contra-rotation of the snail cam allows just sufficient play of the chain to prevent it from unduly wearing the surface of the contacting member on the shoe. Conveniently one end of the helical spring may be secured to the mounting plate by means of a top plate retaining the snail cam, helical spring and chain engaging shoe on the mounting plate. Conveniently also the shoe may be pivotally mounted on the mounting plate for movement under the action of the cam towards a chain to be tensioned.

In a particularly convenient construction the extension portion of the snail cam comprises a hollow cylinder rotatably mounted on a support pin on the mounting plate, the helical spring surrounding at least part of this hollow cylinder. The means torsionally urging the snail cam in the direction of increasing radius may conveniently comprise a spiral spring secured at one end to the cam and at the other to the mounting plate, preferably this spiral spring is mounted within the hollow extension portion in an annular space between part of the inner surface of the extension and a reduced diameter section of the support pin. It will be appreciated that this gives a particularly compact and simple construction.

As a further refinement the mounting plate may incude means for applying lubricant to a chain tensioned by the device. Conveniently such means may comprise a channel in the rear of the mounting plate adapted to be connected to a source of pressure oil when the device is mounted in position on an internal combustion engine, and a bore leading through the plate from the channel for directing lubricant from the channel to a tensioned chain.

The invention will be further described, merely by way of example, with reference to the accompanying drawings, in which:

FIGURE 4 is a view similar to FIGURE 1 showing a modified embodiment of the invention; and FIGURE 5 is an exploded perspective view of the device of FIGURE 4 but with parts being omitted for the sake of clarity.

Figure 1:
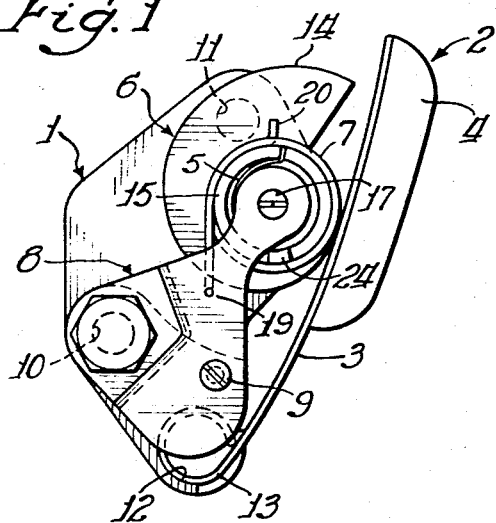
FIGURE 1 is a side view of a chain tensioning device according to the present invention.
Figure 2:
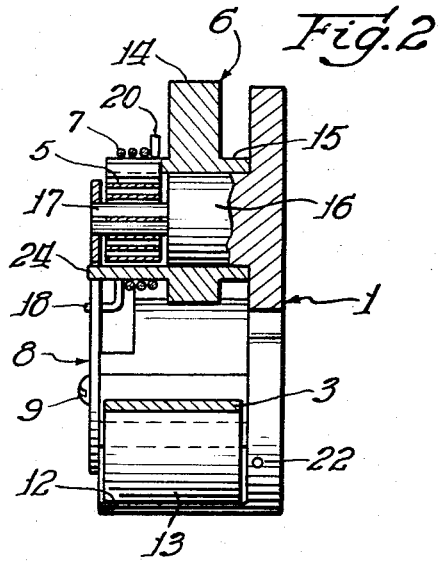
FIGURE 2 is a vertical section of the device shown in FIGURE 1.
Figure 3:
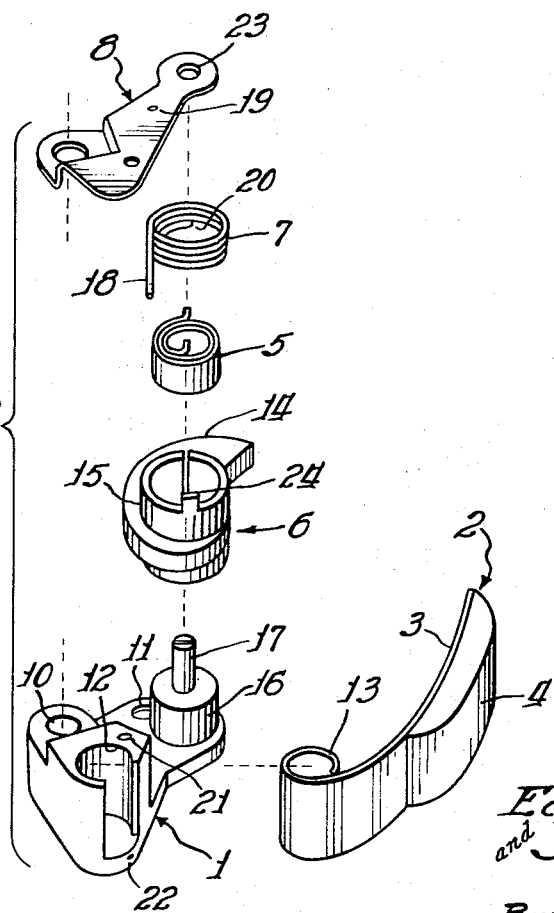
FIGURE 3 is a sketch showing the device in exploded form.

Referring to FIGURES 1 to 3 of the drawings, a device according to the present invention is shown as comprising a body or mounting plate 1 provided with apertures 10 and 11 by which it is adapted to be secured, as by bolts, in location adjacent to the chain to be tensioned. The mounting plate 1 is provided with a recess 12 adapted pivotally to receive the curled end 13 of a follower plate 3 comprising part of the shoe assembly 2. Carried by the plate 3 is a pad 4 which comprises the member adapted to contact the chain during use of the device. This pad 4 may suitably comprise rubber or synthetic plastics material although most suitably it comprises a pad of hard synthetic rubber.

Mounted on the mounting plate 1 is a snail cam 6 having a surface 14 of increasing radius adapted to connect the rear of the plate 3. The snail cam is provided with a hollow cylindrical extension portion 15 extending axially on either side thereof. The snail cam is rotatably mounted on the mounting plate 1 by a support pin 16 forming part of the mounting plate and fitting within the extension portion 15. At the upper end of the pin 16 there is provided a section 17 of reduced diameter which also is received within the extension portion 15 so as to provide an annular space between its outer surface and the inner surface of the extension portion. A spiral actuating spring 5 is mounted within this annular space and has one end secured in a slot in the section 17 and the other end secured to the inner surface of the extension portion of the snail cam. This spring 5 is so arranged as to tend to urge the snail cam in its direction of increasing radius about the axis of the support pin 16. A helical non-return spring 7 is mounted in a position surrounding an outer surface of the extension portion 15. One end 18 of the spring 7 is bent so as to be received in a hole 19 in a top cover plate 8. The other end 20 of the spring 7 is free. The spring 7 is closely wound about the outer surface of the extension portion 15 so as to act as a one way friction clutch whereby rotation of the snail cam 6 in its direction of increasing radius tends to unwind the helical spring so that it disengages the extension portion and permits rotation of the cam, whilst contra-rotation of the snail cam tends to tighten the helical spring about the extension portion whereby it grips the extension portion frictionally to prevent such contra-rotation of the snail cam.

The top plate 8 is secured to the body or mounting plate 1 by means of a screw 9 received within a hole 21 in the mounting plate.

The top plate is provided with an aperture 23 adapted to engage the top end of the reduced diameter section 17 of the mounting pin 16. Excessive rotation of the snail cam 6 is prevented by engagement of a stop 24 with the top plate 8. This stop 24 extends from the top end of the extension portion 15.

The mounting plate 1 is provided with means for, during use of the device, lubricating the chain being tensioned. This means comprises a channel (not shown) in the rear of the mounting plate which, when the device is fixed in its operative position on an internal combustion engine, can be put in communication with a source of oil under pressure. A small bore 22 leads through the plate from this channel for directing oil onto the chain being tensioned.

During use of the device the mounting plate 1 is secured to the engine housing by means of the apertures 10 and 11. The bolt passed through aperture 10 also serves to retain the top plate 8 in position holding the device in its assembled condition. At this time the snail cam is positioned in one extreme position, shown in FIGURE 1, with the stop 24 engaging the plate 8 and with a small radius portion of the cam surface 14 engaging the rear surface of the follower plate 3. The pad 4 then contacts the chain to be tensioned. As the chain elongates due to normal wear the spiral spring 5 serves torsionally to urge the snail cam 6 to rotate in the direction of increasing radius so as to cause the shoe 2 to be moved towards the chain to be tensioned and thus by engaging the chain to take up any slack therein. The spiral spring 7 acts as a one way frictional clutch to prevent a contra-rotation of the snail cam in a direction of decreasing radius. By this means it is ensured that adjustment of the shoe to take up slack in the chain is maintained. The provision of resilient means for restricting contra-rotation of the cam, while positively maintaining proper adjustment of the tensioning shoe against a chain being tensioned, prevents the tensioner being held in a position where the chain is over-tensioned and where excessive wear of the shoe is thus likely to take place.

FIGURE 4 of the drawings shows a modified embodiment of the invention which, although working on the same principle, has various improvements as compared with the previously described embodiment. In general those parts which are the same as in the embodiment of FIGURE 1 are given the same reference numerals while parts which have been changed in any way are indicated with a prime. The changed parts are shown separately in the exploded view of FIGURE 5.

The body or mounting plate 1' of the modified embodiment, instead of being provided with a recess 12 for the pivotal reception of the curled end of the follower plate is provided with a hole 26 adapted to receive with a press fit a pivot pin 27 carried by the cover plate 8'. The pin 27 provides an improved pivotal mounting for the shoe assembly 2' and at the same time provides a connection between the cover plate 8' and the mounting plate 1' which dispenses with the need for a screw 9.

The snail cam 6' is shown provided with a cam surface 14' which is flanged at 28 to provide for a greater, more stable, engagement between the cam surface and the shoe assembly. Whilst this greater width cam surface 14' helps to reduce the effect of wear between the cam surface and the shoe assembly, such wear is reduced still further by moulding the synthetic rubber pad 4' to extend as a relatively thin layer 4" over the rear surface of the plate 3'. This resilient layer 4" is then contacted by the cam surface 14' and resists wear during small movements of the shoe assembly towards and away from the cam surface due to play and variations in the chain being tensioned. The effects of such wear are still further reduced in the embodiment of FIGURE 4 by giving the follower plate 3', where it contacts the cam surface, a curvature approaching that of the maximum radius portion of the snail cam surface.

In order to increase the rigidity and resistance to fracture of the follower plate 3', the plate may be given a channel section or be otherwise formed with strengthening ridges or corrugations extending lengthwise thereof.

Also shown in FIGURE 4 by dotted line 25 is the channel in the rear surface of the mounting plate by means of which pressure oil can be supplied to the bore 22 as previously explained for lubricating the chain being tensioned.

What we claim is:

1. A chain tensioning device comprising a mounting plate, a snail cam having an increasing radius and an extension portion rotatably mounted on the mounting plate, a shoe assembly carrying a chain contacting member adapted in use of the device to be held by the snail cam against a chain to be tensioned, means torsionally urging the cam in the direction of increasing radius, and a one way friction brake having a helical spring secured at one end to the mounting plate and surrounding the extension portion of the snail cam whereby rotation of the snail cam in this direction of increasing radius tends to unwind the helical spring while contra-rotation of the snail cam tends to tighten the helical spring to grip the extension portion for restricting contra-rotation of the cam and in use of the device thus maintaining the shoe in its position held against the chain to be tensioned.

2. A chain tensioning device according to claim 1, wherein the one end of the helical spring is secured to the mounting plate by means of a single top plate for retaining the snail cam, helical spring and chain engaging shoe on the mounting plate.

3. A chain tensioning device according to claim 1, wherein the extension portion of the snail cam comprises a hollow cylinder rotatably mounted on a support pin having a reduced diameter section and secured on the mounting plate with the helical spring surrounding at least a part of said hollow cylinder, and wherein the torsional cam urging means comprises a spiral spring secured at one end to the cam and the other end to the mounting plate, and said spiral spring is mounted within the hollow cylinder in an annular space between the part of the inner surface on the cylinder in the reduced diameter section of the support pin.

4. A chain tensioning device according to claim 1, wherein a stop is provided for preventing excessive rotation of the snail cam.

References Cited
UNITED STATES PATENTS

| 403,048 | 5/1889 | Jones | 74—242.11 |
| 1,605,962 | 11/1926 | Lovejoy | 74—242.11 |
| 1,675,671 | 7/1928 | Stein | 74—242.11 |
| 3,117,463 | 1/1964 | Brindle | 74—242.11 |
| 3,198,025 | 8/1965 | Peras | 74—242.11 |
| 3,272,026 | 9/1966 | Hale | 74—242.11 |

FRED C. MATTERN, Jr., *Primary Examiner.*

J. A. WONG, *Assistant Examiner.*